United States Patent [19]

Hampson

[11] Patent Number: 5,419,965
[45] Date of Patent: May 30, 1995

[54] REINFORCING ELEMENT WITH SLOT AND OPTIONAL ANCHORING MEANS AND REINFORCED MATERIAL INCORPORATING SAME

[75] Inventor: C. Geoffrey Hampson, Ontario, Canada

[73] Assignee: Domecrete Ltd., Richmond Hill, Canada

[21] Appl. No.: 207,108

[22] Filed: Mar. 8, 1994

Related U.S. Application Data

[63] Continuation of Ser. No. 914,026, Jul. 15, 1992, abandoned, which is a continuation of Ser. No. 532,293, Jun. 1, 1990, abandoned.

[51] Int. Cl.⁶ .............................. E04C 5/01; B32B 5/02
[52] U.S. Cl. ................................ 428/397; 428/83; 428/167; 428/192; 428/292; 428/358; 428/399; 428/450; 428/902; 428/903.3; 428/220; 428/156; 428/122; 428/573; 428/575; 428/595; 106/644; 52/659; 52/737; 52/738; 52/740
[58] Field of Search .............. 428/83, 167, 192, 292, 428/358, 397, 399, 450, 903, 903.3, 220, 156, 122, 573, 575, 595; 52/659, 737, 738, 740; 106/644

[56] References Cited

U.S. PATENT DOCUMENTS

| | | | |
|---|---|---|---|
| 761,287 | 5/1904 | Cummings | 52/740 X |
| 761,288 | 5/1904 | Cummings | 52/740 X |
| 811,560 | 2/1906 | Hinchman | 52/737 X |
| 925,989 | 6/1909 | Boyle et al. | 52/737 X |
| 967,390 | 8/1910 | Johnson | 52/737 |
| 1,142,087 | 6/1915 | Golding | 52/737 X |
| 1,594,402 | 8/1926 | Booze | 52/659 |
| 1,976,832 | 10/1934 | Brown | 52/659 |
| 3,400,507 | 9/1968 | MacChesney | 52/659 X |
| 3,429,094 | 2/1969 | Romualdi | 428/294 |
| 3,684,474 | 8/1972 | Chisholm | 52/659 X |
| 3,728,211 | 4/1973 | Balk | 428/378 |
| 3,900,667 | 8/1975 | Moens | 428/292 |
| 3,953,953 | 5/1976 | Marsden | 428/399 |
| 4,119,764 | 10/1978 | Mizuma et al. | 52/737 X |
| 4,229,501 | 10/1980 | Kern | 428/399 |
| 4,233,364 | 11/1980 | van Thiel | 428/399 |
| 4,308,705 | 1/1982 | Hufnagel | 428/399 |
| 4,379,870 | 4/1983 | Matsumoto | 428/399 |
| 4,585,487 | 4/1986 | Destree et al. | 428/399 |
| 4,610,926 | 9/1986 | Tezuka | 428/399 |
| 4,666,485 | 5/1987 | Huey | 428/399 |
| 4,899,515 | 2/1990 | Potucek | 52/737 X |

FOREIGN PATENT DOCUMENTS

| | | | |
|---|---|---|---|
| 610712 | 1/1949 | Canada | 52/737 |
| 712777 | 7/1965 | Canada | 52/740 |
| 875073 | 7/1971 | Canada | 25/154 |
| 1020331 | 11/1977 | Canada | 25/154 |
| 1037733 | 9/1978 | Canada | 72/66 |
| 1038642 | 9/1978 | Canada | 72/60 |
| 1092388 | 12/1980 | Canada | 72/126 |
| 15256 | 6/1912 | France . | |
| 1091634 | 4/1955 | France . | |
| 633334 | 2/1962 | Italy | 52/737 |
| 44558 | 12/1963 | Luxembourg . | |
| 306300 | 8/1955 | Switzerland | 52/737 |
| 160238 | 5/1921 | United Kingdom . | |
| 720615 | 12/1954 | United Kingdom . | |
| 1446855 | 8/1976 | United Kingdom . | |

*Primary Examiner*—William P. Watkins, III
*Attorney, Agent, or Firm*—Bereskin & Parr

[57] ABSTRACT

There is disclosed a reinforcing element for reinforcing a solidified fluid mass such as concrete or refractory comprising an elongate shank having a slot extending along at least a portion of the length of the shank. The slot increases the surface area of the shank and increases the aspect ratio of the element to more firmly bond the element in the mass. Anchoring portions are provided at the ends of the shank and have a width greater than the diameter of the shank.

25 Claims, 3 Drawing Sheets

REINFORCING ELEMENT WITH SLOT AND OPTIONAL ANCHORING MEANS AND REINFORCED MATERIAL INCORPORATING SAME

This application is a continuation-in-part of Ser. No. 07/914,026, filed Jul. 15, 1992, now abandoned, which was a continuation of Ser. No. 07/532,293, filed Jun. 1, 1990, now abandoned.

FIELD OF THE INVENTION

This invention relates to a reinforcing element for reinforcing a solidified fluid mass.

BACKGROUND OF THE INVENTION

It is well known to mix elements having high tensile strength in composite subsequently hardening soft material such as concrete and ceramics which only offer a small resistance to a tensile force. These elements are typically short pieces of wire, made of steel, glass fibre or other materials which, when mixed up in the material with a lower modulus of elasticity, results in a two-phase material of improved strength.

Elements of various forms have been disclosed in a number of prior patent documents, the below listed documents having been considered in the preparation of this specification:
U.S. Pat. No. 3,429,094 to J.P. Romualdi
Canadian Patent No. 1,038,642 to Ostling, et al.
Canadian Patent No. 1,037,733 to Moens, et al.
Canadian Patent No. 875,073 to Claire G. Ball, et al.
U.S. Pat. No. 1,976,832 to C.S.Brown
U.S. Pat. No. 3,900,667 to Moens
U.S. Pat. No. 3,953,953 to Marsden
U.S. Pat. No. 4,233,364 to van Thiel
Canadian Patent No. 1,020,331 to Lankard, David R.
Canadian Patent No. 1,092,388 to Curnow, et al.

A number of these documents, such as, U.S. Pat. No. 3,429,094 to Romualdi, and Canadian Patent No. 1,038,642 to Ostling et al, disclose the use of straight wire elements or fibres, the Ostling patent disclosing the use of elements of substantially rectangular cross-section and small thickness in relation to their length and width formed of steel flakes, with the shape tapering towards the ends of the flakes. The flakes have a thickness of about 0.1 mm to about 0.5 mm and a length of at least about 100 times the thickness.

As illustrated by the Ostling patent, it is recognized that the length to width ratio, or aspect ratio of an element is an important factor in the effectiveness of the element in enhancing the material properties of the final material. Generally, elements having a high aspect ratio provide more desirable characteristics, however such elements are more liable to "clumping" or "bailing" producing problems in handling. In Canadian Patent No. 1,037,733, to Moens et al the preferred ferrous reinforcing elements have a thickness of between about 0.1 mm and 1 mm and length to thickness ratio between about 50 and 200.

It is also recognized that the properties of the material are related to the total surface area of the reinforcing elements, Canadian Patent No. 875,073 to Ball et al disclosing the use of known round or flat reinforcing filaments and the improvements available when compared to round filaments of comparable weights.

It is further recognized that the anchoring of elements is improved by providing elements which are not straight or have an irregular shape. U.S. Pat. No. 1,976,832 to Brown discloses reinforced inserts in the general form of a dumbbell. U.S. Pat. No. 3,900,667 to Moens discloses a wire element consisting of a substantially straight wire having at both extremities a bending in the form for which the hooking in of two neighbouring elements is not possible. This is disclosed as a means for overcoming the problems associated with prior art elements formed in a shallow U-shape.

U.S. Pat. No. 3,953,953 to Marsden discloses elements having enlarged ends. These are formed by folding the edges of a strip of sheet metal onto itself or by edge rolling a strip. In both cases, the reinforcing element is formed by shearing the strip after its edge has been modified. A somewhat more complex fibre shape is disclosed in U.S. Pat. No. 4,233,364 to van Thiel, which discloses anchoring fibres having flattened and enlarged ends, with projections extending from the ends and protuberances provided along the body of the element.

Canadian Patent No. 1,020,331 to Lankard discloses a method of forming large thin shell structure members such as ferro-cement boats using a wire mesh reinforcement and Canadian Patent No. 1,092,388 to Curnow et al discloses the uses of multifilament strands of carbon fibres for reinforcing cement.

SUMMARY OF THE INVENTION

In a first aspect, the invention provides a reinforcing element for reinforcing a solidified fluid mass, said element comprising:
- a generally straight elongate shank having a generally uniform outer diameter and a maximum length of approximately 60 mm;
- a generally straight slot defined along at least a portion of the length of said shank; and
- an anchoring means located at at least one of the end portions of said shank, said anchoring means having a width greater than said outer diameter;

wherein said reinforcing element is adapted to bond with said solidified fluid mass, said bond being adapted to slip in the direction of said straight slot when said solidified fluid mass is under stress without significantly damaging said solidified fluid mass.

In a second aspect, the invention provides a reinforcing element for reinforcing a solidified fluid mass comprising:
- a generally straight elongate shank having a generally uniform outer diameter and a maximum length of approximately 60 mm; and
- a generally straight slot defined along at least a portion of the length of said shank;

wherein said reinforcing element is adapted to bond with said solidified fluid mass, said bond being adapted to slip in the direction of said straight slot when said solidified fluid mass is under stress without significantly damaging said solidified fluid mass.

In a third aspect the invention provides a reinforced material formed of a solidified fluid mass containing a plurality of reinforcing elements, each said reinforcing element comprising:
- a generally straight elongate shank having a generally uniform outer diameter and a maximum length of approximately 60 mm;
- a generally straight slot defined along at least a portion of the length of said shank; and an anchoring means at at least one of the end portions of the shank, said anchoring means having a width greater than said outer diameter;

wherein said reinforcing elements are bonded to said solidified fluid mass, said bond being adapted to slip in the direction of said straight slot when said solidified fluid mass is under stress without significantly damaging said solidified fluid mass.

In a fourth aspect the invention provides a reinforced material formed of a solidified fluid mass containing a plurality of reinforcing elements, each reinforcing element comprising:

a generally straight elongate shank having a generally uniform outer diameter and a maximum length of approximately 60 mm; and a generally straight slot defined along at least a portion of the length of the shank;

wherein said reinforcing elements are bonded to said solidified fluid mass, said bond being adapted to slip in the direction of said straight slot when said solidified fluid mass is under stress without significantly damaging said solidified fluid mass.

In all aspects of the invention, a straight slot is provided in a longitudinal direction along the shank. As mentioned, the slot improves the bond between the element and the solidified fluid mass. In addition, the method of forming the slot provides the element with an increased lateral strength to resist bending in the solidified fluid mass.

A further unexpected advantage is provided by the straight configuration of the slot. This configuration allows the element to "slip out" of its bond when the solidified fluid mass is under stress. This is particularly advantageous when the element is used to reinforce brittle materials, such as high-strength concrete. Conventional reinforcement elements that include mechanical deformations, such as knurled or helical slots, force the material to break before the element is released from its bond. The straight slot, on the other hand, minimizes the damage to the material during failure of the bond. The increased surface area of the element caused by the slot increases the drag as the element slides out of its bond but does not cause the explosive nature of failure associated with a reinforcement element having a more severe mechanical bond.

BRIEF DESCRIPTION OF DRAWINGS

These and other aspects of the present invention will now be described, by way of example, with reference to the accompanying drawings, in which.

DETAILED DESCRIPTION OF DRAWINGS

Figure 1:
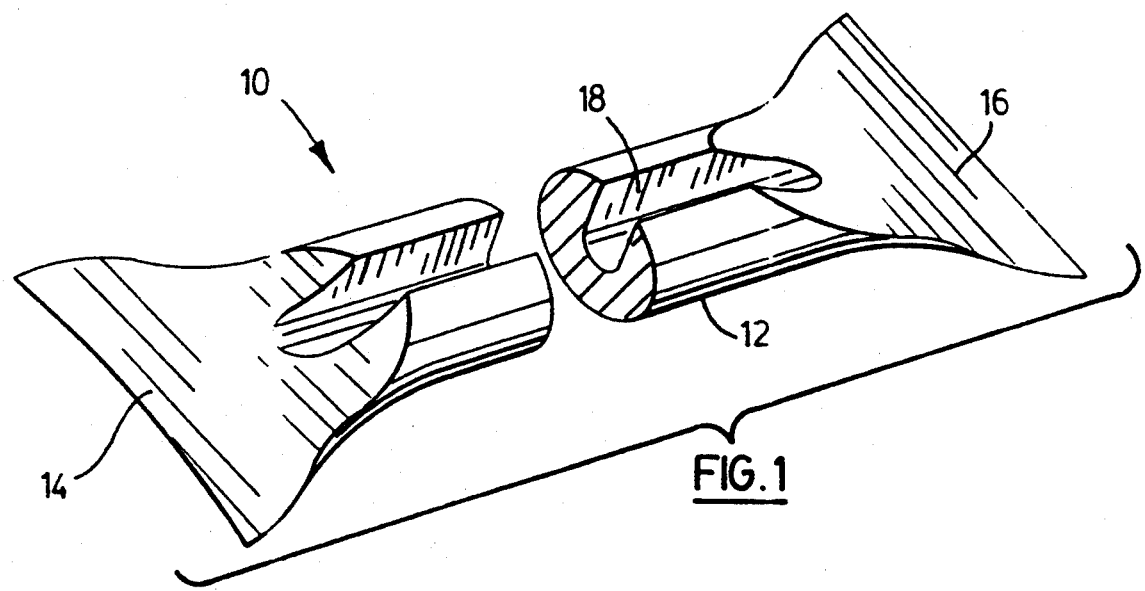
FIG. 1 is a perspective view from above of a reinforcing element in accordance with a preferred aspect of the present invention.
Figure 2:
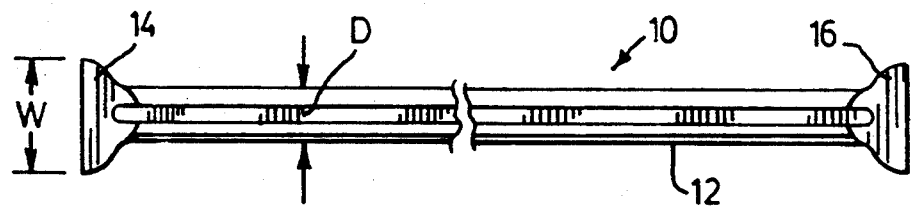
FIG. 2 is a top plan view of the element of FIG. 1.
Figure 3:
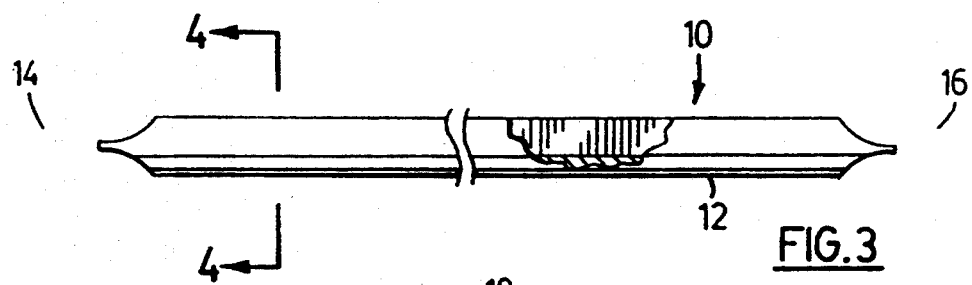
FIG. 3 is an elevational view, shown partly in section, of the element of FIG. 1.

Reference is first made to FIG. 1 of the drawings, which illustrates a reinforcing element, generally indicated at 10, for use in reinforcing composite materials such as concrete and ceramics, in on site applications and in manufactured products. It should be noted that, while the element will be described with particular reference to such uses, that elements of this form are suitable for use in reinforcing a wide range of materials, particularly materials having low tensile strength. A plurality of elements 10 are mixed with the composite material when it is in a liquid state, and subsequently become fixed a random manner in the material matrix on solidification.

Figure 4:
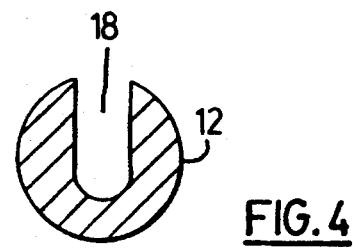
FIG. 4 is a sectional view on line 4—4 of FIG. 3.
Figure 5A:
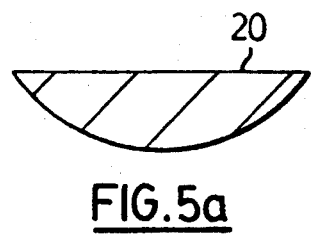
FIGS. 5a–5g illustrate a preferred method for forming the element of FIG. 1 from a crescent-shaped wire.
Figure 5B:
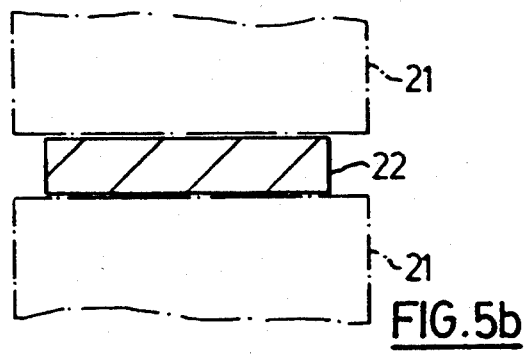
Figure 5C:
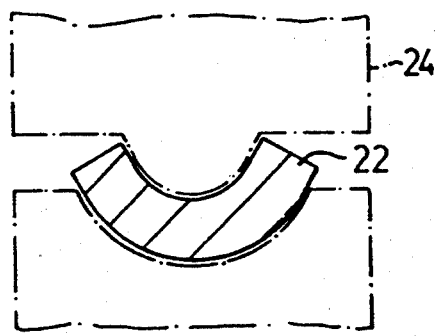
Figure 5D:
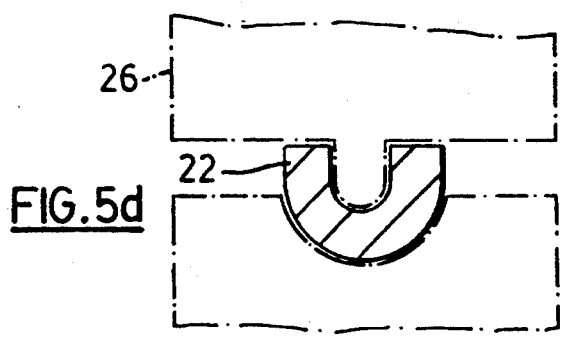
Figure 5E:
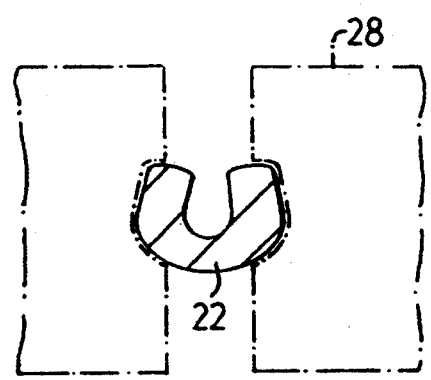
Figure 5F:
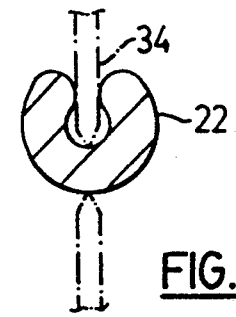
Figure 5G:
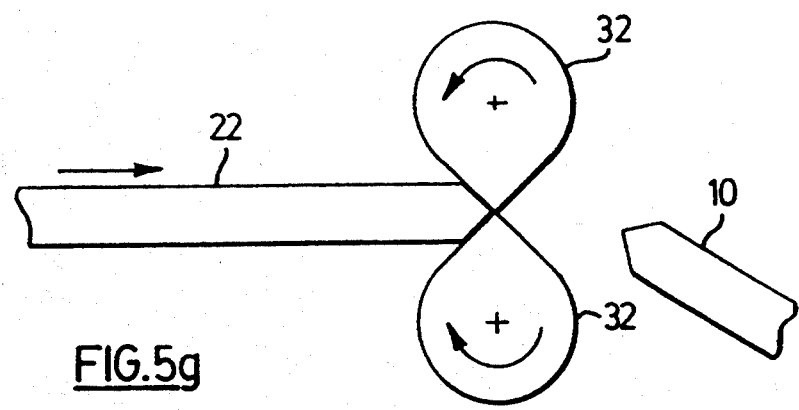

The element comprises a generally elongate shank 12 with flattened end portions providing anchoring tabs 14, 16. The shank 12 is elongate and is provided with a longitudinal slot 18 which extends between the anchoring tabs 14, 16. If the shank 12 is viewed in cross-section, as in FIG. 4 of the drawings, the shank is seen to generally define a cylindrical or rounded U-shape.

The anchoring tabs 14, 16 are formed by either rolling or pinching the ends of the shank 12, and are wider and thinner than the shank.

The provision of the slot in the shank 12 increases the surface area of the element, as compared to a plain cylindrical element, to improve bonding with the composite material. Further, the form of the shank also provides the fibre with increased lateral strength to resist bending in the composite. The form of the shank 12 also provides a smaller effective diameter than an equivalent solid shank, which leads to an increase in aspect ratio without creating additional handling problems, typically balling or clumping together of elements.

As used herein, the term $$\text{effective diameter } (d) = \sqrt{\frac{4A}{\pi}}$$

where A=cross-sectional area of the shank and $$\text{Aspect ratio} = \frac{\text{length of element}}{\text{effective diameter}}$$

The form of the anchoring tabs 14, 16 increases the mechanical bonding of the element in the composite and increases the resistance of the element to pullout.

It will be noted from the figures that the slot 18 is aligned perpendicularly to the anchoring tabs 14, 16. Further, the tab widths W exceed the outside diameter D of the shank 12 by a factor of between 1.2 and 1.7 and most preferably by a factor of about 1.5.

The elements are typically formed of steel wire, the forming process being described hereinbelow, and may be provided in a variety of different sizes. Shorter elements, such as element #2 described below, are preferred for use in forming materials such as precast concrete, shotcrete and refractory. Longer elements, such as element #1 described below, are preferred for use in slab-on grade applications or in areas where concrete is poured.

Specifications of two typical elements are set out below:

|  | Element #1 | Element #2 |
|---|---|---|
| Length | 60 mm | 30 mm |
| Effective Diameter | 1.0 mm | 0.6 mm |

|  | Element #1 | Element #2 |
|---|---|---|
| Aspect Ratio | 60 | 50 |
| Weight | 0.1 gram | 0.6 gram |
| Specific Gravity | 7.8 | 7.8 |

Uses of the fibres in on-site concrete applications include: commercial/industrial floors, industrial floors, floor overlays, highway pavements, highway overlays, airport runway and taxiway slabs, airport runway and taxiwayoverlays, bridge deck overlays, irrigation canals, tunnel liners, mine liners, dam aprons, dams and reservoirs, shell structures and gunite, containment and explosion-resistant structures, security applications, seismic structures, prestressed beams and slabs, and refractory linings. Uses of the fibres in manufactured concrete products include: manholes and covers, concrete pipes, utility poles, weight coating for offshore pipelines, transformers and machine pads, railway ties, wall panels, roof panels and tiles, floating dock modules, marine structures, precast specialties, thin shell shapes, curtain walls, sound barrier walls, precast load-bearing panels, burial vaults, steps, security applications, and small pre-cast forms for agricultural requirements. Steel fibre reinforced ceramics may be used in furnace bricks, reactor linings and ash bins, and in these applications, the more heat resistant stainless steel alloy fibres are preferred.

Conveniently, the elements are formed from steel wool waste wire, which is a high quality carbon steel. However, as mentioned above, for applications in which elements are required to withstand high temperatures, a stainless steel alloy element may be more appropriate, though for the majority of applications the use of carbon steel will be sufficient.

Steel wool is formed by shaving thin wires from a thicker wire, and the thicker wire is shaved until only a crescent-shaped wire portion remains. Normally this waste wire would simply be scrapped.

One preferred process of forming elements is illustrated schematically in FIG. 5 of the drawings. The crescent-shaped waste wire 20 is first cleaned of oil and other contaminants and is then rolled flat, using rollers 21, to a uniform thickness and width to provide a rectangular section wire 22. The wire 22 is then pulled through three series of rollers 24, 26, 28 (steps c), d) and e)) which progressively bend the wire to bring the edges closer together such that on leaving the last set of rollers 28 the wire defines a rounded or generally cylindrical U-shape 30. The wire 30 then passes through a set of gears 32 (step g))which cut the wire into individual elements and simultaneously flatten the ends of the elements. The elements then fall into a bagging hopper for collection.

If it is desired to produce smaller diameter elements, following passing through the last set of rollers 28, the wire 30 passes through a slitter 34 (step f)) to produce two substantially flat strands which are then passed through a further set of rollers, corresponding to the rollers 24, 26, 28, to form a slot, and cut and flattened as described above.

The work hardening of the wire as the various rollers raises the tensile strength of the elements to over 200,000 p.s.i.

Figure 6:
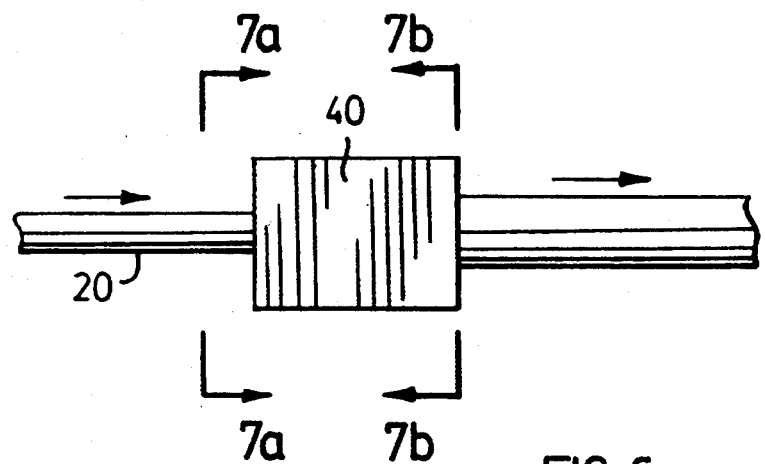
FIG. 6 illustrates a second preferred method for forming the element of FIG. 1 from a crescent-shaped wire.
Figure 7A:
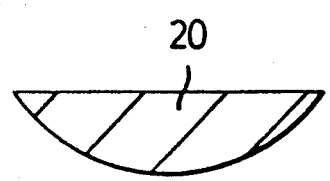
FIGS. 7a and 7b are sectionals views on lines 7a–7a and 7b–7b of FIG. 6.
Figure 7B:
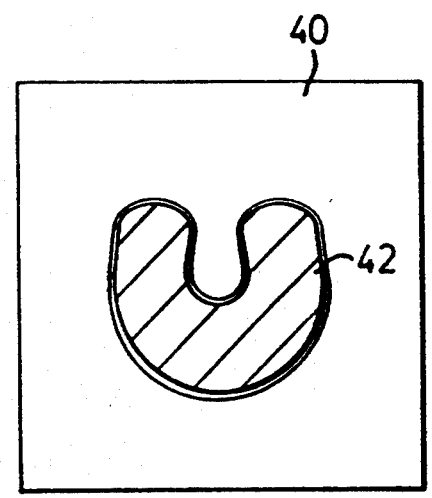

A further preferred process of forming elements is illustrated in FIG. 6 of the drawings. Rather than rolling the crescent-shaped wire 20, the wire is pulled, round side down, through a die 40 which has the final desired form as on opening 42, as seen in FIG. 7b of the drawings. As the wire 20 is pulled through the die, the sides are curled up and around into the desired U-shaped cross-section. The wire is then passed through a set of gears, like step g of the other process illustrated in FIG. 5 to cut the wire into individual elements and simultaneously flatten the ends of the elements.

Thus, it can be seen that the elements can be produced relatively simply from what would otherwise be scrap material.

It will be clear to those skilled in the art that the particular elements and element-forming processes described above are merely exemplary of the present invention, and that various modifications and improvements may be made without departing from the scope of the invention.

I claim:

1. A reinforcing element for reinforcing a solidified fluid mass, said element comprising:
   a generally straight elongate shank having a generally uniform outer diameter and a maximum length of approximately 60 mm;
   a generally straight slot defined along at least a portion of the length of said shank; and
   an anchoring means located at at least one of the end portions of said shank, said anchoring means having a width greater than said outer diameter;
wherein said reinforcing element is adapted to bond with said solidified fluid mass, said bond being adapted to slip in the direction of said straight slot when said solidified fluid mass is under stress without significantly damaging said solidified fluid mass.

2. The reinforcing element of claim 1, wherein said slot is defined substantially over the length of said shank.

3. The reinforcing element of claim 2, wherein the aspect ratio of said reinforcing element, relative to the effective diameter of said shank, is between about 50 and 60.

4. The reinforcing element of claim 3, wherein the width of the anchoring means is greater than said outer diameter by a factor of between about 1.2 and 1.7.

5. The reinforcing element of claim 4, wherein the anchoring means has a thickness lesser than said outer diameter.

6. The reinforcing element of claim 1, wherein said shank with said slot has a generally U-shaped cross section.

7. The reinforcing element of claim 6, wherein the width of said anchoring means is substantially perpendicular to the depth of the slot.

8. The reinforcing element of claim 7, wherein said shank is formed from shaved wire.

9. The reinforcing element of claim 7, wherein the effective diameter of the shank is about 1 millimeter.

10. The reinforcing element of claim 7, wherein the effective diameter of the shank is about 0.6 millimeter.

11. A reinforcing element for reinforcing a solidified fluid mass comprising:
   a generally straight elongate shank having a generally uniform outer diameter and a maximum length of approximately 60 mm; and
   a generally straight slot defined along at least a portion of the length of said shank;
wherein said reinforcing element is adapted to bond with said solidified fluid mass, said bond being adapted to slip in the direction of said straight slot when said solidified fluid mass is under stress without significantly damaging said solidified fluid mass.

12. The reinforcing element of claim 11, wherein the slot is defined substantially over the length of the shank.

13. The reinforcing element of claim 12, wherein the aspect ratio of the element, relative to the effective diameter of said shank, is between about 50 and 60.

14. The reinforcing element of claim 13, wherein the shank with said slot has a generally U-shaped cross-section.

15. The reinforcing element of claim 14 wherein the effective diameter of the shank is about 1.0 mm.

16. The reinforcing element of claim 14, wherein the effective diameter of the shank is about 0.6 mm.

17. A reinforced material formed of a solidified fluid mass containing a plurality of reinforcing elements, each said reinforcing element comprising:
   a generally straight elongate shank having a generally uniform outer diameter and a maximum length of approximately 60 mm;
   a generally straight slot defined along at least a portion of the length of said shank; and
   an anchoring means at at least one of the end portions of the shank, said anchoring means having a width greater than said outer diameter;
wherein said reinforcing elements are bonded to said solidified fluid mass, said bond being adapted to slip in the direction of said straight slot when said solidified fluid mass is under stress without significantly damaging said solidified fluid mass.

18. The reinforced material of claim 17, wherein the solidified fluid mass is concrete.

19. The reinforced material of claim 17, wherein the solidified fluid mass is a ceramic.

20. A reinforced material formed of a solidified fluid mass containing a plurality of reinforcing elements, each reinforcing element comprising:
   a generally straight elongate shank having a generally uniform outer diameter and a maximum length of approximately 60 mm; and
   a generally straight slot defined along at least a portion of the length of the shank;
wherein said reinforcing elements are bonded to said solidified fluid mass, said bond being adapted to slip in the direction of said straight slot when said solidified fluid mass is under stress without significantly damaging said solidified fluid mass.

21. The reinforced material of claim 20, wherein the solidified fluid mass is concrete.

22. The reinforced material of claim 20, wherein the solidified fluid mass is a ceramic.

23. The reinforcing element of claim 8, wherein said shaved wire is steel wool waste wire.

24. A reinforcing element as claimed in claim 14, wherein said shank is formed from shaved wire.

25. A reinforcing element as claimed in claim 24 wherein said shaved wire is steel wool waste wire.

* * * * *